United States Patent
Pagel

[15] 3,675,565

[45] July 11, 1972

[54] PHOTOGRAPHIC APPARATUS

[72] Inventor: Armin B. Pagel, Janesville, Wis.

[73] Assignee: Eastman Kodak Company, Rochester, N.Y.

[22] Filed: April 7, 1970

[21] Appl. No.: 26,275

[52] U.S. Cl. .................................95/11 L, 240/1.3, 240/2 C
[51] Int. Cl. ....................................................G03b 15/035
[58] Field of Search........................................95/11; 240/1.3

[56] References Cited

UNITED STATES PATENTS 3,463,067   8/1969   Fauth..........................................95/11

*Primary Examiner*—John M. Horan
*Attorney*—Robert W. Hampton and J. Addison Matthews

[57] ABSTRACT

The disclosure relates to the provision of a camera with a mechanism which operates automatically prior to each film exposure to index a so-called flashcube or other multiple lamp flashbulb unit until the mechanism detects the arrival of an unfired bulb at a predetermined firing position. In contrast to previously known related devices which require the flashbulb unit to be installed before the film is advanced in preparation for the corresponding exposure, the invention allows the automatic indexing operation to be performed regardless of whether the flashbulb unit is installed before or after such film advancement has occurred. Means are also disclosed whereby such a mechanism is capable of performing repetitively between successive film advancing operations so that a replacement flashbulb unit can be indexed automatically after the mechanism has already indexed the previous flashbulb unit and has failed to detect the presence of any usable bulb therein.

5 Claims, 19 Drawing Figures

PATENTED JUL 11 1972
3,675,565
SHEET 1 OF 6
FIG. 1
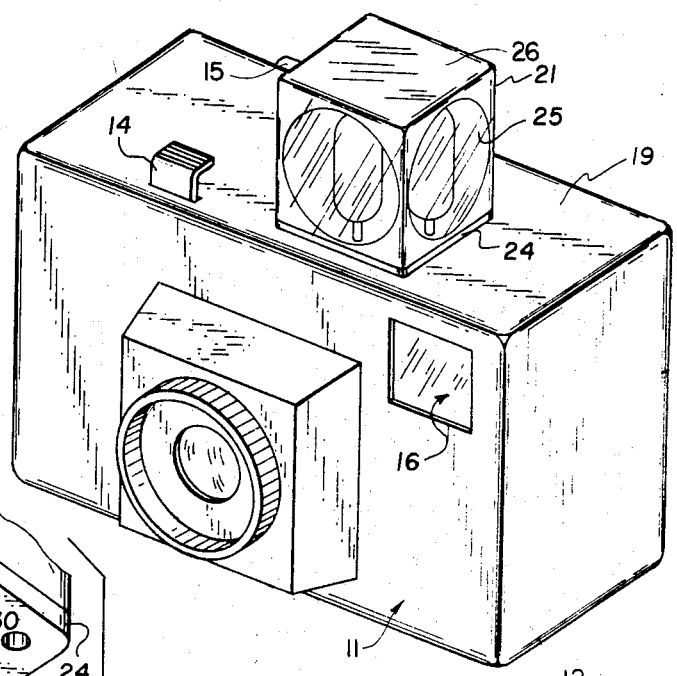
FIG. 2
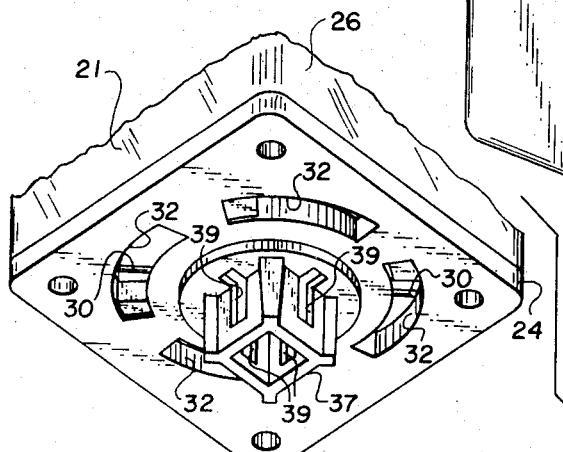
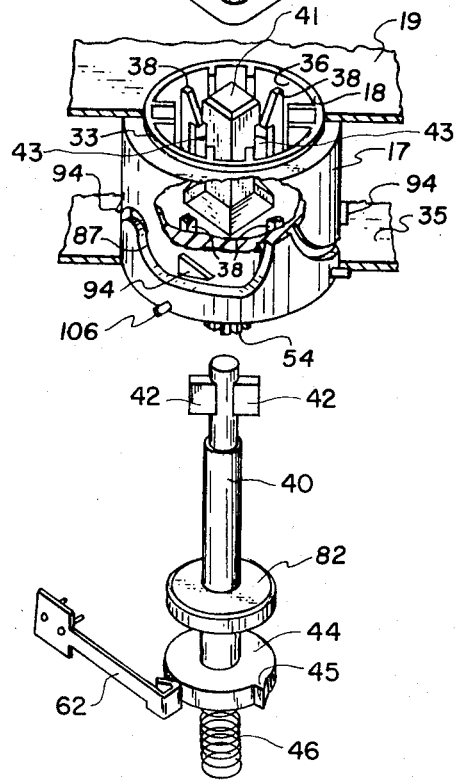
FIG. 3
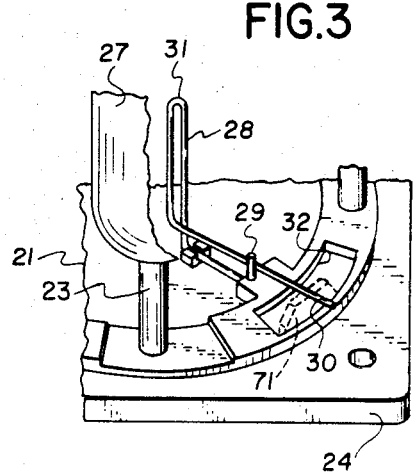
ARMIN B. PAGEL
INVENTOR.
BY *J. Adding Mathew*
*Robert W Hampton*
ATTORNEYS

ARMIN B. PAGEL
INVENTOR.

BY J. Addison Mathew
Robert W. Hampton
ATTORNEYS

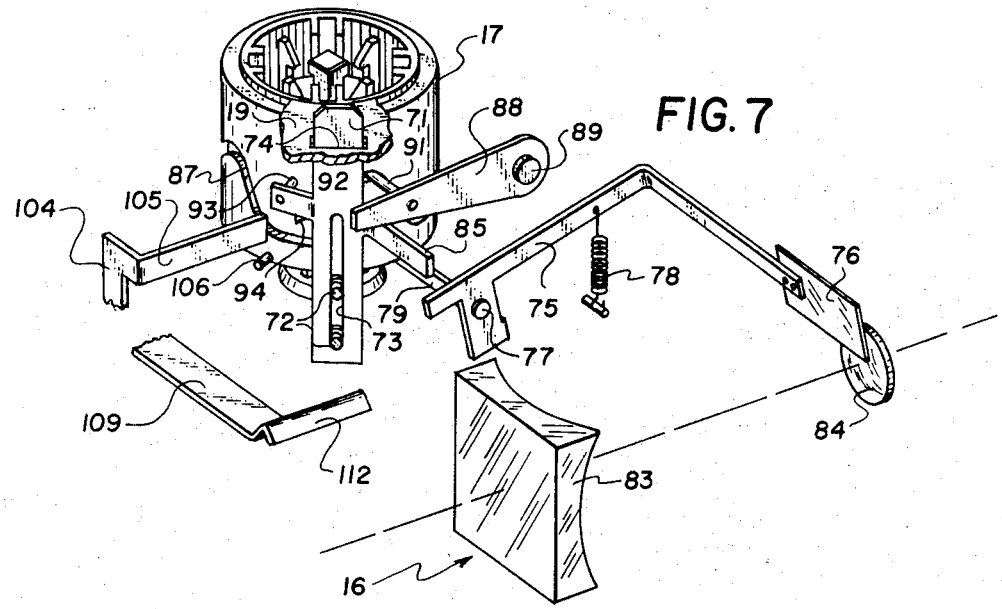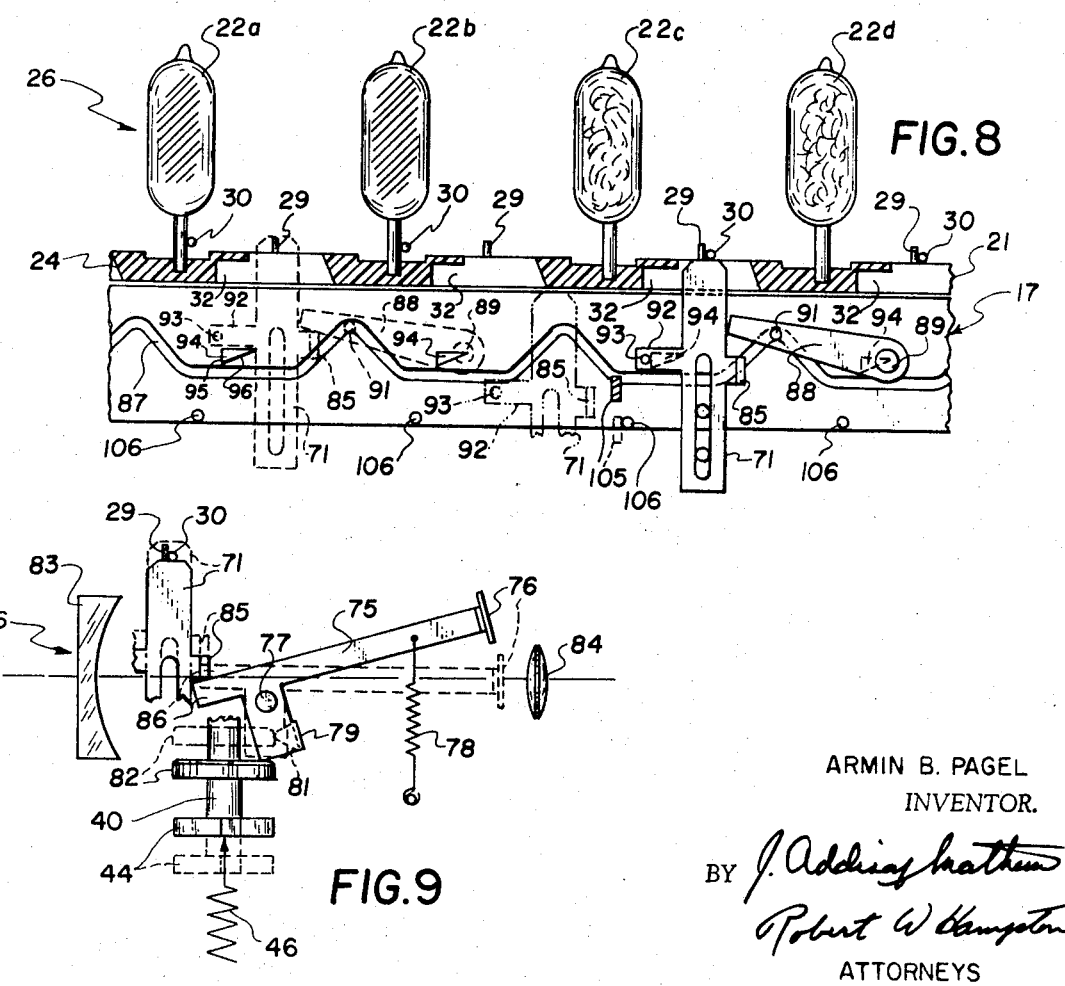

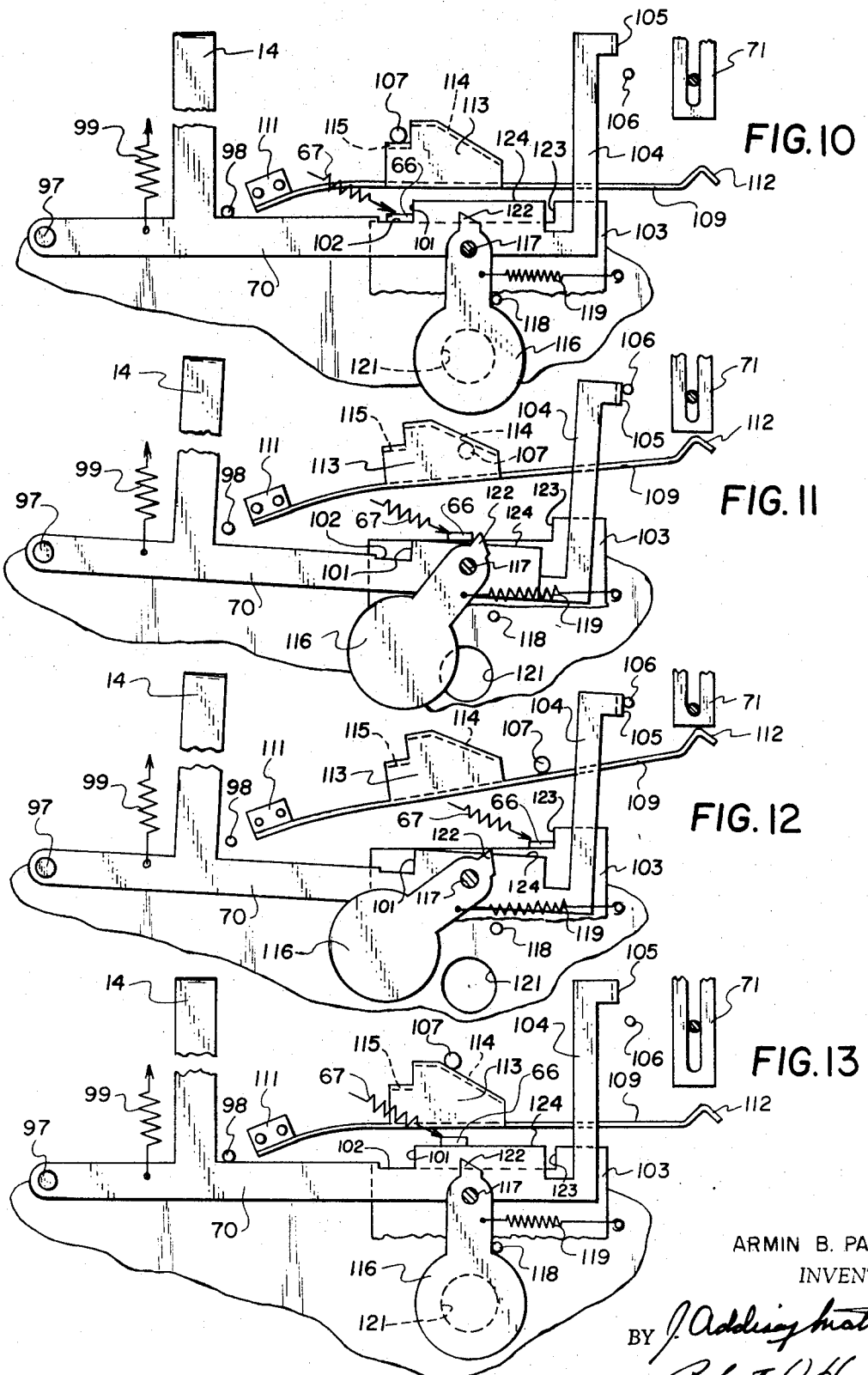

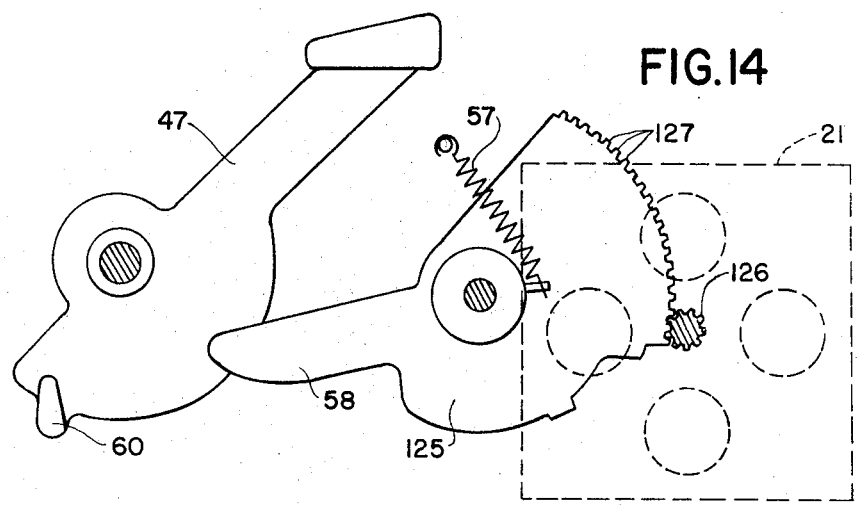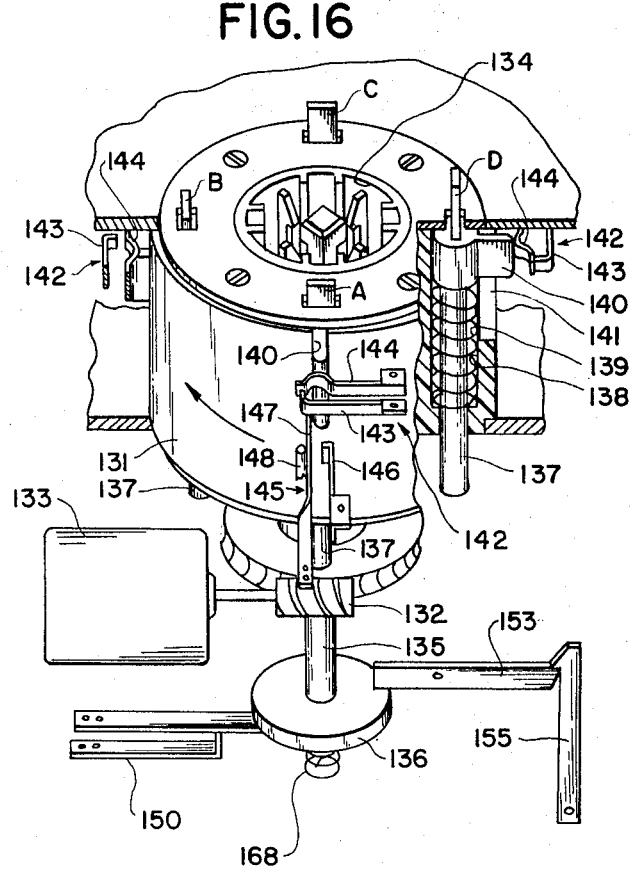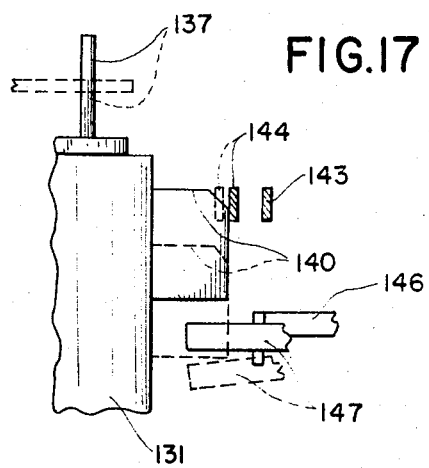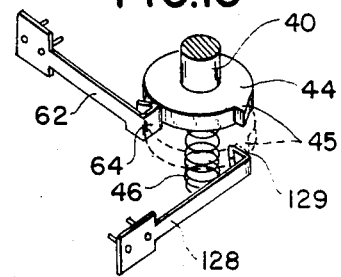

FIG.18
FIG.19
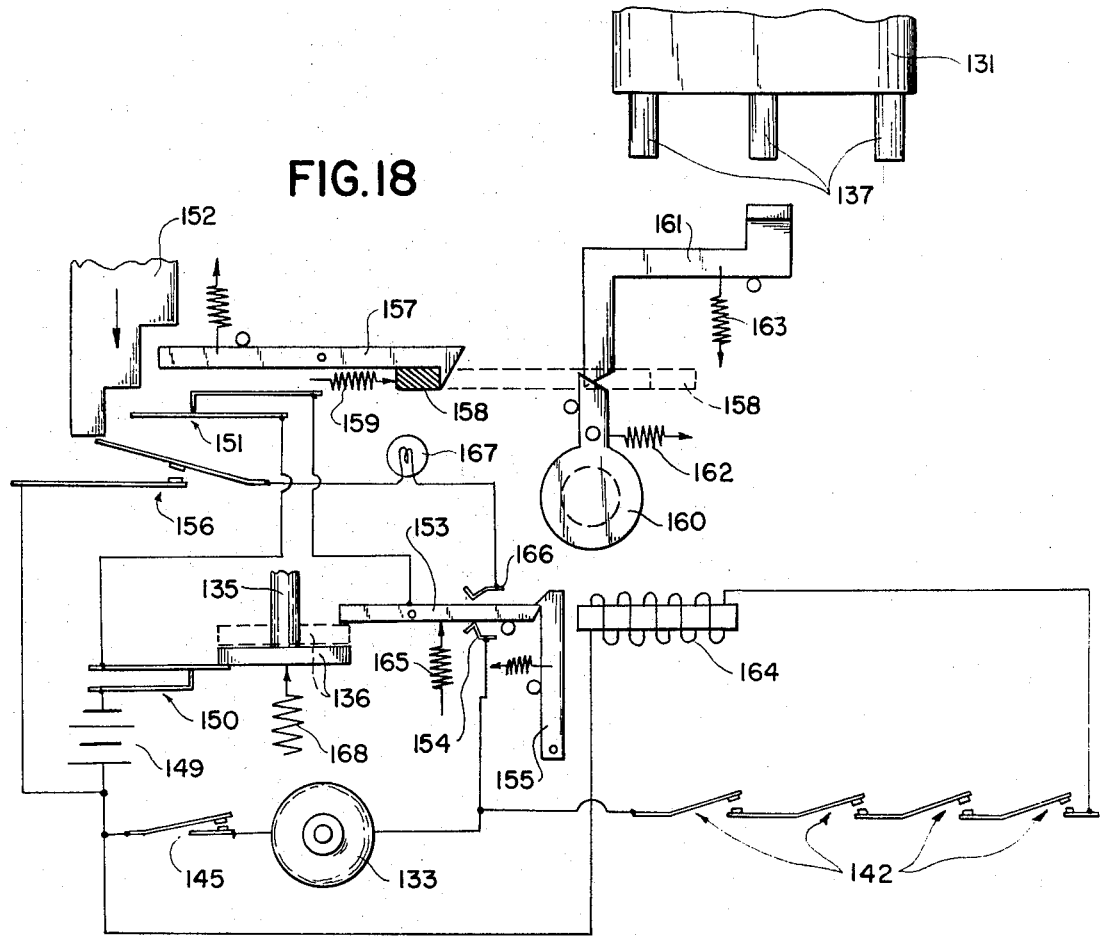
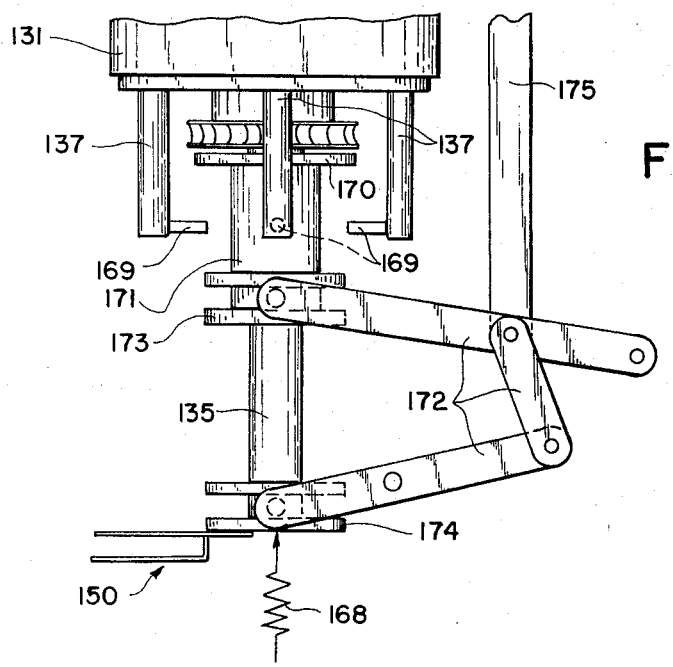
ARMIN B. PAGEL
INVENTOR.
BY
ATTORNEYS

PHOTOGRAPHIC APPARATUS

BACKGROUND OF THE INVENTION

1. Field of the Invention

The present invention relates to photographic cameras and more particularly to improved camera mechanisms for automatically indexing a so-called flashcube or other multiple flashlamp unit until an unfired lamp is detected at a predetermined firing position.

2. Description of the Prior Art

Many modern cameras are adapted to use so-called flashcubes comprising four flash lamps or bulbs combined in a single flashbulb unit, which is received by a socket member that can be rotated to move each lamp, in turn, into firing position. In the past, the lamps of such flashcubes have been fired by electrical means, but similar percussively fired flashcubes have recently been developed, as described, for example, in commonly assigned copending U.S. patent application Ser. No. 850,701, entitled "Flash Firing and Sensing Mechanism for Camera Or Attachment Adapted To Use Percussively Fireable Flashlamps," filed in the names of W. H. Horton and C. W. Michatek on Aug. 14, 1969 now U.S. Pat. No. 3,624,726.

In order to bring successive lamps of a flashcube into firing position, it is well known to rotationally advance the flashcube socket member of a camera through successive 90° angles in response to successive operations of the camera's film winding mechanism. Since the lamp being advanced to firing position may already have been fired, it is also known to provide a signal system for alerting the photographer to the presence of an inoperative lamp at that position so that he can replace the flashcube or advance it manually to locate an operative lamp at the firing position. In cameras adapted to use electrically ignited flashcubes, such a signal system generally comprises means for testing the condition of a lamp by the use of an electrical current of insufficient strength to effect ignition, as disclosed, for example, in U.S. Pat. No. 3,383,995. Similarly, as disclosed in the aforementioned Horton et al. U.S. patent application, the condition of a lamp in a percussively ignitable flashcube can be determined by mechanically sensing the position of a striker element incorporated in the flashcube.

In accordance with the invention disclosed in commonly assigned copending U.S. patent application Ser. No. 854,567, entitled "Flashbulb Indexing Mechanism," filed in the name of Donald M. Harvey on Sept. 2, 1969, now U.S. Pat. No. 3,630,131, a camera adapted to use a flashcube or other multiple flashbulb unit is likewise provided with warning signal means and with an indexing mechanism which operates in response to each successive advancement of the camera film. However, instead of simply moving the next available lamp into firing position each time the film is advanced, the indexing mechanism is adapted to sense the condition of the lamp located at the firing position and to continue the indexing movement of the flash unit until a usable lamp is brought to that position; thereby insuring that each successive film advancing operation will move a usable lamp into firing position unless all of the available lamps have been previously fired; whereupon the warning signal will appear to alert the photographer to that situation.

If all of the lamps in the multiple flashbulb unit have already been fired, that unit obviously must be replaced before a flash illuminated exposure can be made. Since the indexing mechanism only operates concurrently with the advancement of the film, which has already taken place, the replacement lamp unit will not be indexed automatically. Similarly, the same situation will also exist whenever the photographer decides to install a flashbulb unit after he has already advanced the film. In either of those instances, therefore, if one or more of tee lamps in the flashbulb unit has previously been fired, the presence of such a lamp at the firing position will be indicated by the signalling device but the photographer will then have to visually inspect the flashbulb unit and index it manually to locate a usable bulb at the firing position. This operation is not only inconvenient, but is also somewhat confusing because the signal device is normally intended to indicate that no usable lamps are available in the flashbulb unit installed on the camera.

SUMMARY OF THE INVENTION

The present invention relates to multiple flashbulb indexing mechanisms generally similar to those described above and provided with corresponding signal devices but including means for indexing a flashbulb unit automatically to locate an unfired bulb at the firing position regardless of whether the flashbulb unit is installed on the camera before or after the advancement of the film has taken place. Means are also disclosed whereby such a mechanism is capable of performing repetitively between successive film advancing operations so that a replacement lamp unit can be indexed automatically after the mechanism has already indexed the previous lamp unit and has failed to detect the presence of any usable lamp therein.

Various means for practicing the invention and other advantages and novel features thereof will be apparent from the following detailed description of illustrative preferred embodiments of the invention, reference being made to the accompanying drawings in which like reference numerals denote like elements.

BRIEF DESCRIPTION OF THE DRAWINGS

In the accompanying drawings:

FIG. 1 is a perspective view of a camera of a type adapted to accommodate a flashcube indexing mechanism according to the present invention;

FIG. 2 is a perspective view of the base of a percussively ignitable flashcube and of a camera socket member adapted to receive the same;

FIG. 3 is a perspective fragmentary view of a percussively ignitable flashcube, partially depicting one of the flashbulbs therein and showing the percussive ignition means associated with that bulb;

FIG. 7 is a perspective illustration of the flashcube socket shown in FIG. 2, depicting the operative elements associated therewith in accordance with the present invention to sense the condition of the flashcube bulbs and to control the rotation of the socket accordingly;

FIG. 8 is a diagrammatic flat development of the structure shown in FIG. 7, illustrating the manner in which the indexing of the socket member is controlled through the agency of cam means associated therewith;

FIG. 9 is an end view of the signal device incorporated in the structure shown in FIG. 7, illustrating the means by which a signal is provided in the camera viewfinder to indicate the presence or absence of a usable bulb in a flashcube mounted on the camera;

FIGS. 10–13 are somewhat schematic front elevational views of the shutter and ignition actuating means incorporated in the camera shown in the foregoing figures, illustrating the relative positions of the depicted components during successive stages of operation as the shutter operating member is actuated and as the film is thereafter wound to prepare the camera for the next exposure;

FIG. 14 corresponds generally to portions of FIG. 4 and illustrates a modification of the camera shown in FIGS. 1–13 which enables the flashcube indexing mechanism to completely index two successive flashcube units after each operation of the film advancing mechanism;

FIG. 15 is a fragmentary perspective view showing the two operative positions of the disk member incorporated in the embodiment of the invention depicted in FIG. 14;

FIG. 16 is a perspective view of a flashcube socket and its associated operative components comprising an alternate embodiment of the invention in which the flashcube indexing function is performed by an electrically powered motor;

FIG. 17 is a fragmentary elevational view of a portion of the structure shown in FIG. 16 showing the manner in which the condition of a flashcube lamp is detected;

FIG. 18 is a schematic wiring diagram of the embodiment of a camera according to the embodiment of the invention illustrated in FIG. 17; and FIG. 19 is a somewhat schematic illustration of a flashcube ejection mechanism associated with a flashcube socket shown in FIG. 16.

DESCRIPTION OF THE ILLUSTRATIVE PREFERRED EMBODIMENTS

Figure 4:
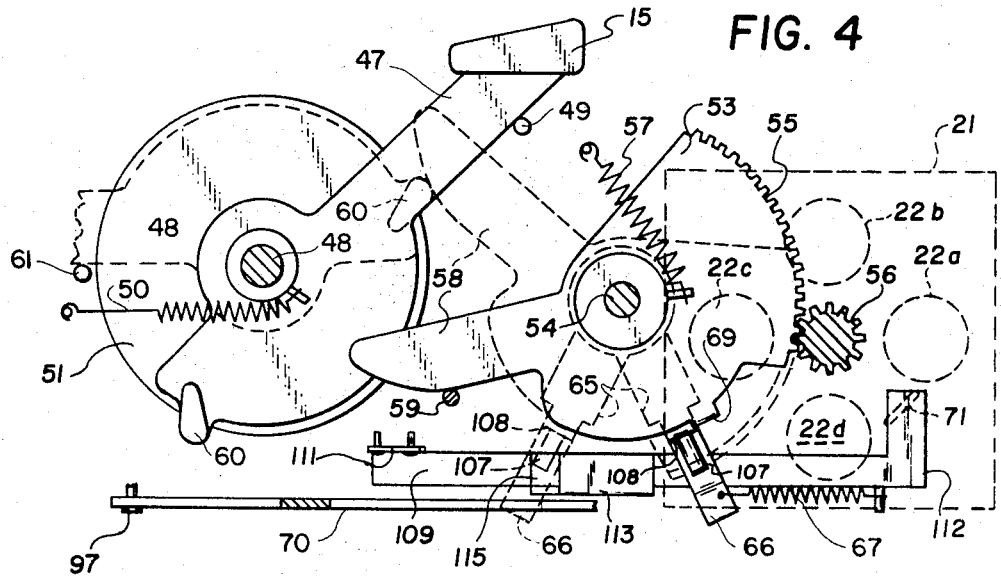
FIG. 4 is a somewhat schematic plan view of the drive mechanism of a camera comprising a preferred embodiment of the present invention.

The embodiment of the invention illustrated in FIGS. 1–13 is adapted to provide automatic indexing of a flashcube installed on a camera after the film has already been advanced in preparation for the next film exposure but does not include means for providing repetitive indexing. In general this embodiment of the invention comprises a modification of the structure disclosed in the above-identified U.S. patent application Ser. No. 854,567.

The camera shown in FIG. 1, designated by numeral 11, is of generally conventional appearance, comprising a boxlike housing 12, an objective lens assembly 13, a shutter operating member 14, a handle 15 of a film winding lever, and a viewfinder 16. As shown in FIG. 2, a socket member 17 is located within the camera housing and is accessible through a circular opening 18 in the top housing wall 19 to allow a percussively ignitable flashcube 21 to be rotatably supported atop the camera.

As described more specifically in the aforementioned concurrently filed Horton et al. U.S. patent application Ser. No. 850,701, the percussively ignitable flashcube comprises four flashbulbs 22a through 22d, which are supported by their respective ignition tubes 23 on a generally square base member 24. A reflector member 25 provides a concave reflecting surface behind each respective flashbulb, all of which are enclosed in a transparent housing 26 attached to the base member. As best shown in FIG. 3, each of the flashbulbs includes a glass envelope 27, which is partially filled with fine zirconium wire or some other combustible material adapted to provide illumination when ignited. The ignition tube 23 of each flashbulb is hollow and relatively thin and contains a percussion sensitive primer material coated on a central anvil pin within the bore of the tube. As is also shown in FIG. 3, each of the flashbulbs is associated with a corresponding percussion member comprising a resilient striker wire 28, one end of which is supported to the base member and projects upwardly to provide a stop pin 29. The opposite free end of the striker wire is disposed horizontally as shown at 30, and is biased toward the ignition tube of the corresponding flashbulb by the torsional influence of the upwardly extending central loop 31 of the wire. Initially, the free end of the striker wire is trapped in a cocked position behind stop pin 29 above the corresponding arcuate slot 32 in the flashcube base member. If the free end of the striker wire is lifted beyond its stop pin, however, it will snap into percussive contact with the ignition tube of the corresponding bulb. The impact of the wire against the ignition tube locally pinches the tube against the anvil pin, causing the primer material to be exploded and thrown upwardly into the glass envelope to effect ignition of the combustible material within the bulb envelope.

Figure 5:
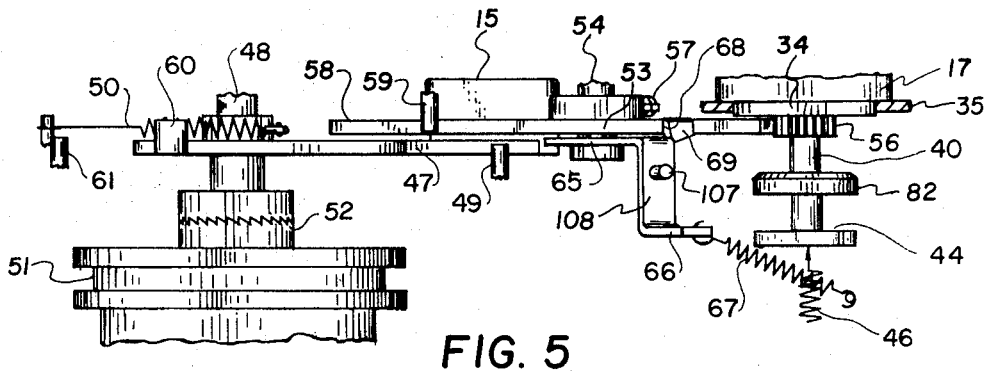
FIG. 5 is a front elevational view of the mechanism depicted in FIG. 4.

The flashcube socket member 17 is of generally cylindrical configuration and is rotatably supported by the reception of its cylindrical upper shoulder 33 in circular opening 18 of the top wall of the camera housing and by the reception of a similar lower shoulder, shown at 34 in FIG. 5, in a corresponding opening in support plate 35. As disclosed in greater detail in the aforementioned Horton et al. U.S. patent application Ser. No. 850,701, the socket member is provided with a central opening 36 adapted to receive the generally rectangular base post 37 of a percussively ignitable flashcube to rotationally align the flashcube with the socket member. When the flashcube is thus installed in the socket, four resilient pawl fingers 38 in the latter engage corresponding openings or slots 39 in the flashcube base post to hold the flashcube in its loaded position. Although the flashcube can be manually withdrawn from the socket in opposition to the resilient pawl fingers, the latter are of sufficient strength to prevent the flashcube from being dislodged by the upward pressure exerted on the ignition wires to fire the flashbulbs.

For purposes hereinafter described, a sensing pin 40 is received in the tubular central stud 41 of the socket member with its opposed wings 42 extending outwardly through stud slots 43 into socket opening 36. A pawl disk 44 provided with a pawl tooth 45 is located at the lower end of pin 40 and is engaged by a spring 46 which urges the pin to a raised position when the socket is empty but allows it to be depresssed by the base post of a flashcube loaded into the socket member.

Referring now to FIGS. 4 and 5 of the accompanying drawings, the subject camera will be seen to include a film winding mechanism comprising a winding lever 47 carried by a rotatably supported vertical shaft 48 and biased in a clockwise direction against a stop pin 49 by a spring 50. The lower end of shaft 48 is connected to the film take-up spool 51 within the camera through a unidirectional clutch depicted at 52, thereby causing film to be wound onto the take-up spool in response to reciprocatory movement of the winding lever. A sector member 53 is rotatably supported by vertical stud 254 and includes gear sector 55 permanently meshed with pinion 56 at the lower end of the socket member. A spring 57 biases the sector member in a counterclockwise direction to the position shown in solid lines in FIG. 4. The sector member 53 is driven against the bias of spring 57 by a cocking member 253 also rotatably supported by vertical stud 254 and having an arm 58 resiliently biased toward a stop pin 59. When the sector member is in the position shown in solid lines in FIG. 4, the flashcube received in the socket member is located in parallel relation to the camera housing. Accordingly, the four flashbulbs initially occupy the respective positions shown in broken lines in FIG. 4, with bulb 22d located at the firing position.

Figure 6:
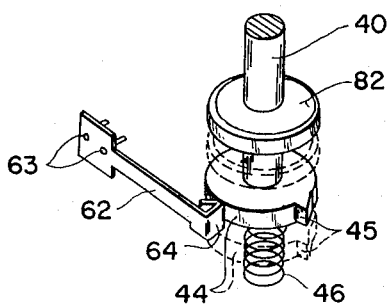
FIG. 6 is a fragmentary perspective view showing the two operative positions of the pawl disk member employed to selectively block rotation of the flashcube socket member.

The end of the sector arm 58 overlaps the edge of the firing lever in the path of movement of drive stud 60 projecting upwardly therefrom. Therefore, when winding lever 47 is moved manually into contact with abutment pin 61, as shown in broken lines in FIG. 4, drive stud 60 engages arm 58 and rotates the cocking member in a clockwise direction to the position likewise shown in broken lines. The cocking member 253 includes a lug 69 positioned to engage an ear 255 on the sector member 53 when the cocking member is moved in a clockwise direction to move the sector member also in a clockwise direction. Such rotation imparts counterclockwise rotation to socket member pinion 56 and thereby rotates the socket member through slightly more than 270° so that flashbulb 22a is moved slightly beyond the firing position. Referring to FIG. 6a resilient pawl finger 62 is supported by an element of the camera housing by rivets 63 so that its nose 64 is in peripheral contact with pawl disk 44 whenever the latter is in its raised position, i.e., whenever the socket is empty. After a flash illuminated photograph has been made but before the camera film has again been advanced, pawl tooth 45 on disk 44 is positioned approximately 90° beyond the nose of the pawl finger in a counterclockwise direction as shown in FIGS. 2 and 6. If the previously fired flashcube has been removed from the socket member before the film is advanced, the subsequent counterclockwise rotation of the socket through somewhat more than 270° carries pawl tooth 45 slightly past pawl finger nose 64. The engagement of the pawl finger nose with the pawl tooth therefore prevents the socket member from rotating in the opposite direction until the installation of a flashcube in the socket member has moved the cam disk to its lower position shown in broken lines in FIG. 6, thus disengaging the pawl tooth from the pawl finger. If a flashcube is present in the socket member during the film advancing operation, the pawl disk likewise remains in its lowered position and therefore cannot interfere with clockwise rotation of the socket member.

Drive lever 65 is rotatably supported on stud 54 below sector member 53 with its forwardly extending driving arm 66 biased both downwardly and in a counterclockwise direction by a spring 67. The sloped edge 68 of a depending lug 69 on the sector member engages the drive lever and rotates the latter in a clockwise direction in opposition to spring 67 as the sector member is driven in the same direction by the winding lever. As will be described later, the end of arm 66 connected to spring 67 is held upwardly until it reaches the cocked position shown in broken lines in FIG. 4, whereupon it drops out of engagement with lug 69 and is latched in that position by latch bar 70. Consequently, during the return movement of the winding lever to its former position by spring 50, arm 66 remains in its cocked position while spring 57 biases the socket member in a clockwise direction to move an operable bulb therein into firing position, as will be explained in greater detail below. Preferably, the camera is provided with a film metering mechanism which arrests movement of the winding lever each time a film frame is moved into exposure position. Regardless of the manner in which the film winding is controlled, however, each successive winding operation requires at least one complete movement of the winding lever and not more than a subsequent partial movement of that lever through an angle less than that required to move drive stud 60 into engagement with sector arm 58. Thus, each successive film winding operation will effect only one counterclockwise rotation of the socket member, in the manner just described.

A firing slide 71 is supported laterally adjacent the socket member by support rivets 72 extending through vertical elongate slot 72, as best depicted in FIG. 7. The upper end of the firing slide extends through a corresponding slot 74 in the upper wall member of the camera and is located directly below the position assumed by the free end of the cocked firing wire associated with the flashcube bulb located in firing position. When the firing slide is in its lowermost position, its upper end is flush with the top surface of the top housing wall 19 and below the lower surface of the base member of a flashcube installed in the socket. If the firing slide is moved upwardly, its upper end enters the corresponding slot in the flashcube base member and engages the cocked firing wire. So long as the upward force exerted to the firing slide is insufficient to raise the firing wire past the corresponding stop pin, the firing slide will therefore assume an intermediate position shown in solid lines in FIG. 8 and 9, which is indicative of the fact that the corresponding bulb is still operable. When greater upward force is exerted on the firing slide, however, the cocked striker wire engaged thereby will be released from its stop pin as the slide moves to its raised position shown in FIG. 7 and in broken lines in FIG. 8, thereby effecting ignition of the bulb.

A signal lever 75, provided with a translucent signal vane 76, is supported for rocking movement by pivot stud 77 and is biased downwardly by a weak coil spring 78. An arm 79 extends from the signal lever beneath the socket member and is provided with a cam nose 81, shown in FIG. 9. As previously mentioned, when no flashcube is present in the socket member, sensing pin 40 is located in its raised position by spring 46. Consequently, cam disk 82, carried by the sensing pin above pawl disk 44, is likewise raised to the position shown in broken lines in in FIG. 9. Disk 82 therefore engages cam nose 81 and holds the signal lever in the position shown in solid lines in FIGS. 7 and 9 to maintain the signal vane above the field of view of the viewfinder comprising lenses 83 and 84. Whenever a flashcube is installed in the socket member, its base post depresses the sensing pin so that the cam disk is located as shown in solid lines in FIG. 9, beyond engagement with cam nose 81. Therefore, the position of the signal vane is then established in accordance with the location of the firing slide through the engagement of tongue 85 of the latter with ear 86 of the signal lever, which urges the firing lever upwardly under the influence of spring 78. Since the strength of spring 78 is insufficient to disengage the free end of the striker wire from its stop pin, the presence of a usable bulb at the firing position will allow the firing slide to move upwardly only to its intermediate position shown in solid lines in FIGS. 8 and 9. Accordingly, the signal vane is maintained above the field of view of the viewfinder so that no warning signal is presented to the camera operator. If the bulb at the firing position has already been used, the failure of the firing slide to encounter the corresponding striker wire will allow spring 78 to move that slide to its uppermost position, shown in broken lines in FIGS. 8 and 9; thus allowing the signal vane to move downwardly into view as similarly depicted in FIG. 9.

To prevent the firing slide from interfering with rotation of the flashcube, it will be apparent that the slide must be retracted temporarily to its lowermost position shown in dotted lines in FIG. 8 during each indexing movement of the socket member. This function is performed by cam means comprising a continuous cam channel 87 extending about the cylindrical periphery of the socket member. A cam follower lever 88 is pivotally supported by stud 89 and carries a cam follower pin 91 received in the cam channel. Accordingly, as the socket member rotates, the free end of the cam follower lever is raised each time one of the base slots of the flashcube moves into alignment with the firing slide and is lowered as further rotation of the socket member moves the slot beyond alignment with the firing slide. The free end of the cam follower lever is positioned directly above tongue 85 of the firing slide, and is urged upwardly thereby under the influence of the relatively weak spring 78 connected to the signal lever. Therefore, the upper end of the firing slide moves vertically in coordination with the movement of the free end of the cam follower lever so that it enters each successive slot in the flashcube base as the latter is rotated by the socket member. Whenever the firing slide encounters a cocked striker wire, its upward movement is arrested so that it remains in its intermediate position while the cam follower lever completes its upward movement. If no cocked striker wire is encountered, the firing slide moves to its uppermost position, thereby causing the signal vane to appear in the viewfinder.

The same cam operated arrangement for moving the upper end of a firing slide into and out of the slots in the base of a percussively ignitable flashcube is also employed in the camera disclosed in the previously identified commonly assigned U.S. patent application Ser. No. 854,567. In accordance with that disclosure, the flashcube is simply indexed through successive 90° angles by a socket driving mechanism operated directly by a film winding lever or the like. As will be recalled from the foregoing description of the present invention, however, the rotatively biased socket member 17 is cocked by operation of the winding lever and is thereafter released so that a flashcube carried by the socket member rotates in a clockwise direction until a usable bulb arrives at the firing position. Firing slide 71 therefore functions not only to operate the signal means in accordance with the condition of the bulb at the firing position, but also to arrest such reverse rotation of the socket member when the first usable bulb has reached that position.

To accomplish this additional function, the firing slide is provided with a lateral ear 92 which carries a stop pin 93 terminating immediately adjacent the cylindrical peripheral surface of the socket member. As shown at 94 in FIGS. 7 and 8, four uniformly spaced blocking lugs project outwardly from the cylindrical peripheral surface of the socket member with their vertical leading faces 95 facing in the direction of clockwise rotation of that member, i.e., to the left as depicted in FIG. 8. During the upward movement of the firing slide engaged with cam follower lever 88, stop pin 93 clears the leading face of the adjacent blocking lug. Whenever the firing slide encounters a cocked striker wire, however, its upward movement is arrested at its intermediate position. Accordingly, the leading face of the adjacent blocking lug encounters stop pin 93, as shown in solid lines in FIG. 8, thereby blocking rotation of the socket member with the corresponding bulb located in position to be fired. In order to prevent the blocking lugs from similarly arresting the initial counterclockwise rotation of the socket member, the lower faces of the lugs are sloped as shown at 96 in FIG. 8 so that they can bypass stop pin 93 by camming the firing slide downwardly in opposition to spring 78. It should also be noted that when a flashcube is installed in the socket member after the film has already been advanced, pawl finger 62 does not disengage pawl disk tooth 45 until the installation movement of the flashcube has brought it to the position at which the firing slide will be depressed by engagement with a cocked striker wire 28. In other words, by the time the pawl disk is released, the indexing rotation of the socket member is under the control of the mechanism which detects the condition of the flashcube bulbs and limits the socket rotation accordingly.

During rotation of the flashcube, the signal vane will appear momentarily in the viewfinder each time a previously fired bulb moves past the firing position, but will be maintained out of view when the socket member comes to rest with a usable bulb in that position. Therefore, the vane will remain in its visible position only if no usable bulb is available, notwithstanding the sequence of fired and unfired bulbs in the flashcube. Thus, when the flashcube ceases its clockwise rotation, the absence of the visible signal indicates that the camera is ready to be operated to produce a flash illuminated photograph in response to manual depression of shutter operating member 14.

The mechanism employed to operate the camera shutter and to fire the forwardly facing flashcube in synchronism therewith is illustrated in FIGS. 10-13. The aforementioned latch bar 70 is pivotally supported by stud 97 and is urged upwardly toward stop pin 98 by a relatively strong spring 99. After the film winding and bulb positioning operation has been completed, the latch bar and the shutter operating member 14 extending therefrom are located as shown in FIG. 10; with the tip of the cocked drive lever arm 66 trapped by shoulder 101 of the latch bar and resting on horizontal top surface 102 of a stationary guide rail 103. The end of the latch bar opposite stud 97 is provided with an upwardly extending arm 104 which carries a blocking ear 105 positioned laterally adjacent the socket member, as best shown in FIG. 7. When the latch bar is in its raised position, ear 105 is located below the path of movement of blocking lugs 94 but above the lower movement path of four similarly disposed blocking pins 106 projecting radially from the lower edge of the socket member, and therefore cannot interfere with rotation of the latter.

Above the tip of driving arm 66, a horizontal drive pin 107, also shown in FIGS. 4 and 5, is supported by vertical segment 108 of that arm. A resilient striker blade 109 is rigidly supported at one end by mounting ear 111 and is provided at its opposite end with a hammer member 112 located directly below the firing slide engaged with the cocked firing wire of the operatively positioned flashbulb. A cam member 113 is carried by the striker blade and includes a rearwardly facing sloped upper lip 114 and a shorter rearwardly facing lower lip 115. When the camera is in the condition represented in FIG. 10, the lower lip 115 of the cam member is trapped below drive pin 107, thereby maintaining the striker blade in its depicted position with its hammer member below the firing slide. As previously explained, the relatively strong spring 67 urges the tip of driving arm 66 both laterally and also downwardly, thus maintaining that arm temporarily in contact with guide rail 103 in opposition to the weaker upward force exerted on drive pin 107 by the resiliency of the striker blade.

The camera shutter, which is of the well-known impact type, comprises a shutter blade 116 pivotally supported by pivot stud 117 and biased toward pin 118 by a weak spring 119 to maintain the blade normally in alignment with the objective lens aperture shown at 121. A drive lug 122 projects upwardly from the shutter blade beyond the top surface 102 of guide rail 103 and is adapted to be struck by the drive arm, thereby momentarily opening the shutter as explained below.

Upon manual depression of the shutter operating member to the position shown in FIGS. 11 and 12, in opposition to spring 99, shoulder 101 of the latch bar disengages the tip of driving arm 66, causing that arm to be driven rapidly along the top surface of guide rail 103 by spring 67. During such movement of the driving arm, drive pin 107 passes below the sloped upper lip 114 of cam member 113, as shown in FIG. 10 and cams the striker blade upwardly, supplementing the resilient upward force of the striker blade itself. Consequently, the hammer member 112 strikes the lower end of the firing slide and drives that slide upwardly to effect ignition of the operatively positioned flashbulb by dislodging the cocked firing wire. Concurrently, the tip of the driving arm strikes shutter blade drive lug 122 and pivots the shutter blade out of alignment with the objective lens aperture to expose the camera film. Since both the operation of the striker blade and the firing of the bulb are effected in response to the movement of the driving arm, the bulb therefore flashes in predetermined timed relation to the opening of the shutter.

By the time the tip of driving arm 66 abuts against shoulder 123 of guide rail 103, as shown in FIG. 12, it has passed beyond engagement with the shutter blade, which is then returned to its initial position as soon as spring 119 overcomes the inertia of the blade. Also, it will be seen from FIG. 12 that the arrival of the driving arm at the end of its movement path is accompanied by the movement of drive pin 107 beyond the cam member carried by the striker blade, which remains temporarily in its uppermost position.

When the hammer member drives the firing slide upwardly to effect bulb ignition, stop pin 93 moves upwardly past engagement with the corresponding blocking lug 94 on the socket member as depicted in broken lines in FIG. 8. However, the downward movement of the latch bar has now positioned its ear 105 in alignment with the corresponding blocking pin 106 on the socket member, as shown in FIGS. 11 and 12, thereby preventing the flashcube from rotating as the bulb is being fired.

Upon the release of the shutter operating member, the latch bar is returned to its raised position shown in FIGS. 10 and 13, thus returning ear 105 to its inoperative position and lifting the tip of the driving arm above guide rail 103 to re-engage that arm with the gear sector. This upward movement of the tip of the driving arm also raises drive pin 107 to a position in horizontal alignment with the top surface of the sloped cam member. When the winding lever is again operated, the resulting cocking movement of the driving arm therefore causes drive pin 107 to cam the striker blade downwardly as shown in FIG. 13, as the tip of arm 66 rides along the upper edge surface 124 of the latch bar past drive lug 122 of the shutter blade. As it approaches its initial cocked position, the tip of arm 66 drops past shoulder 101 at the end of latch bar surface 124, thus disengaging the driving arm from the sector lever and restoring the various components to their inoperative positions shown in FIG. 10.

From the foregoing description, it will be apparent that the mechanism depicted in FIGS. 1-13 will effect automatic indexing of a flashcube which is either already installed in the socket member when the film is advanced or which is installed after the film has been advanced with the socket member empty. However, if the film is advanced while a completely inoperable flashcube is located in the socket, the indexing mechanism will rotate the socket member through an angle of 270° in an attempt to locate a usable bulb, thereby preventing the indexing mechanism from again performing automatically after a replacement flashcube has been installed. This deficiency can be readily overcome, however, by modifying the previously disclosed mechanism as illustrated in FIGS. 14 and 15, in which the unaltered elements of the camera are identified by the same reference numeral previously used.

In the embodiment of the invention shown in FIGS. 14 and 15, sector member 125 and pinion 126 are substituted for the previously described corresponding elements 53 and 56 and are identical to those elements except for the gear ratio established between the sector teeth 127 and the pinion, which is such as to effect counterclockwise rotation of the socket member through an angle of somewhat more than 630° in response to each complete movement of winding lever 47. Additionally, a second pawl finger 128 is supported to the camera housing so that when the pawl disk is lowered, pawl finger nose 129 will engage pawl tooth 45 at a position displaced approximately 90° in a counterclockwise direction from the arrested position of the raised pawl tooth engaged by pawl finger 62.

If the socket is empty when the winding lever is operated, the socket will be rotated in a counterclockwise direction through slightly more than 630° as pawl tooth 45 cams past the nose of pawl finger 62. Upon completion of such rotation, pawl tooth 45 will engage pawl finger 62, thereby temporarily preventing the socket from rotating in the opposite clockwise direction. When a flashcube is installed, the pawl disk moves downwardly out of engagement with pawl finger 62 and the flashcube is automatically indexed as previously described. If no usable bulb is available, however, the clockwise movement of the socket member is blocked after it has rotated through 270° by the engagement of pawl finger 128 with the lowered pawl tooth 45. When that flashcube is removed from the socket, the pawl disk is moved back to its raised position by spring 46 and can rotate through an additional 90° increment before being arrested again by pawl tooth 45. Installation of a replacement flashcube then again depresses the pawl disk, whereupon the socket is further rotated in a clockwise direction through an additional 270° increment to locate an operable bulb automatically at the firing position. If an inoperable flashcube is present in the socket during the film winding operation, the mechanism obviously performs in a similar manner to allow the replacement flashcube to be indexed automatically. If desired, the mechanism can be designed to eliminate the intermediate 90° movement of the socket member, thereby requiring an initial movement of only somewhat more than 540°, but the illustrated arrangement is considered preferable in that it eliminates close tolerances that would otherwise be required to insure dependable and accurate indexing movement.

The embodiment of the invention depicted in FIGS. 16 through 19 of the drawings performs the same functions as the mechanisms described above but is capable of repeating the automatic flashcube indexing operation indefinitely without regard to the advancement of the film.

FIG. 16 shows the socket indexing mechanism employed in this embodiment of the invention in association with a bulb ignition and shutter operating device substantially identical to the one previously described. Socket member 131 is similar to the flashcube socket disclosed in commonly assigned copending U.S. patent application Ser. No. 855,467 entitled "Socket For Percussively Ignitable Multiple Lamp Flashbulb Units," filed in the names of William H. Horton and Edward L. Sturm on Sept. 2, 1969, and is adapted to be rotated in a counterclockwise direction through worm gear 132 by a miniature electric motor 133. The base post of a flashcube is retained in central opening 134 of the socket member in the manner previously disclosed and depresses a sensing pin 135 provided with a lower disk 136. Four firing pins 137 are mounted for vertical movement in holes 138 in the socket member and are biased upwardly by springs 139. If a bulb is usable, the upper end of the corresponding firing pin engages the cocked firing wire associated with that bulb so that the pin assumes its lower position shown at A and B in FIG. 16 and in broken lines in FIG. 17. If a bulb has been fired, however, the pin assumes a raised position shown at B and C in FIG. 16 and in solid lines in FIG. 17. A lug 140 projects radially from each firing pin through a corresponding slot 141 in the socket member and assumes a corresponding position.

Four normally open signal switches 142, each comprising a stationary blade 143 and a movable blade 144, are located laterally adjacent the socket member and are adapted to be closed whenever the respective lugs 140 aligned therewith are in their raised positions. In other words, each signal switch will remain open until it is engaged by the raised lug of a firing pin associated with a previously fired flashbulb.

A normally closed indexing switch 145 comprising a fixed blade 146 and a movable blade 147 is located below the signal switch associated with the bulb in the firing position and is adapted to be engaged by the corresponding lug when that lug is in its lowered position. As the socket member is driven in a counterclockwise direction by the motor, the engagement of a lowered lug with movable switch blade 147 opens that switch to deenergize the motor and also provides a positive stop for the socket member by abutting against stop pin 148.

Referring to FIG. 18, it will be seen that motor 133 is wired in series with battery 149 through: (1) a normally open master switch 150 held shut by disk 136 of the depressed sensing pin 135, (2) a normally closed disabling switch 151 engageable by shutter operating slide 152, (3) a latching relay arm 153 which is held in engagement with contact 154 by latch arm 155, and (4) through the normally closed indexing switch 145 just described. Accordingly, motor 133 drives the socket member in a counterclockwise direction until a lowered lug engages movable blade 147 of the indexing switch, thereby opening that switch to deenergize the motor and at the same time physically blocking further movement of the socket with the corresponding operable bulb located at the firing position.

When a usable bulb has thus been moved to the firing position, the depression of shutter operating slide 152 first closes a normally open lamp energizing switch 156, the function of which will be described below. Further depression of the slide then releases a latch bar 157 from a spring loaded driving member 158 and simultaneously opens disabling switch 151. As soon as the latch bar disengages the driving member, spring 159 drives the latter rapidly to the position shown in broken lines in FIG. 3. During such movement, the driving member strikes shutter blade 160 and hammer member 161, thereby momentarily opening the shutter and simultaneously pivoting the hammer member upwardly so that it engages and lifts the firing pin 137 associated with the operatively positioned flashbulb. Therefore, that bulb is ignited in synchronism with the opening of the shutter, whereupon both the shutter blade and the hammer member pivotally rebound to their original positions under the influence of their respective springs 162 and 163. Since the upward movement of the firing pin by the firing hammer disengages the lug of that pin from movable blade 147 of the indexing switch, that switch is closed but the drive motor is temporarily prevented from initiating rotation of the socket member due to the fact that disabling switch 151 remains open until the shutter operating slide is released. Thus, the flashcube is prevented from rotating while the flash illuminated exposure is being made. As the shutter operating slide is subsequently returned to its raised position, disabling switch 151 closes and indexing switch 145 is also closed due to the fact that the lug on the corresponding firing pin has now been raised. Therefore, motor 133 indexes the socket member until the next usable bulb is in firing position, whereupon the same sequence of operations can be repeated.

After all four bulbs have been fired, the raised positions assumed by the firing pin lugs will cause all of the signal switches 142 to be closed when the socket reaches one of its four index positions. These four switches are wired in series with each other and with battery 149 and solenoid 164. Therefore, the four closed signal switches allow a current to pass through solenoid 164 which attracts latch arm 155 out of engagement with latching relay arm 153; whereupon that arm moves out of engagement with contact 154 under the influence of spring 165. This immediately deenergizes the solenoid and disables the motor but leaves latching relay arm 155 in its raised position in engagement with contact 166, which is wired in series with signal lamp 167 and lamp energizing switch 156. When switch 156 is closed by the next initial downward movement of the shutter operating slide, signal lamp 167 will therefore illuminate the camera viewfinder to warn the operator that he should discontinue depressing slide 152 if he wishes to effect a flash illuminated exposure.

When the flashcube is removed from the socket member, sensing pin 135 is moved upwardly by spring 168 and thereby recocks latching relay arm 153. Simultaneously, master switch 150 opens to de-activate the entire electrical system as long as no flashcube is present in the socket. When a replacement flashcube is installed, sensing pin 135 moves downwardly to again close master switch 150, whereupon the flashcube will be indexed in the same manner previously described. If the replacement flashcube has a usable bulb in the firing position, the corresponding firing pin can be depressed to its lower position by temporarily flexing movable contact blade 147 of indexing switch 145 downwardly without opening the switch, thus causing the socket member to index until the next usable bulb is in firing position.

Since relatively little force is required to dislodge the cocked firing wires, it will be apparent that springs 139 and the movable blades of the indexing and signal switch must be correspondingly weak in order that none of the firing pins will disengage the corresponding firing wires as the flashcube is being installed. To further minimize this possibility, a mechanism can be included as disclosed in FIG. 19. In this embodiment, the firing pins 137 are provided with inwardly projecting pins 169 engageable by a collar 170 of a slide spool 171 movable vertically on sensing pin 135. A linkage 172 connects the double flange 173 of the slide spool with a similar double flange 174 of the sensing pin, which corresponds to the previously described disk 136, thereby causing downward movement of the pin to effect upward movement of the spool and vice versa. When the flashcube is removed from the slide socket, which can be accomplished by depressing an ejector bar 175, the upward movement of the sensing pin is accompanied by downward movement of the spool, which retracts all four firing pins to their lower positions. As a new flashcube is installed, it depresses the sensing pin, thereby allowing the four firing pins to rise under the influence of their respective springs and thereby to assume positions depending upon the condition of their respective flashbulbs.

While the foregoing description of illustrative embodiments of the invention relates to use of so-called flashcubes, it should be recognized that the invention is also applicable to other types of multiple bulb flash units. Likewise, the invention is not necessarily limited to percussively ignited flash units but could be adapted to other types of bulb ignition systems. For example, the previously mentioned electrical means for sensing the condition of electrically fired flashcube bulbs could be combined with appropriate solenoid means adapted to control the indexing movement of the flashcube socket member, thereby achieving the same functional mode of operation provided by mechanical means in the illustrative embodiments of the invention. Furthermore, it should be understood that the various components which are combined in the above-described embodiments of the invention are not limited in novelty or utility to those particular combinations but may be employed advantageously in other types of cameras or in auxiliary flash illumination units in various combinations or subcombinations with one another.

The invention has been described in detail with particular reference to illustrative preferred embodiments thereof, but will be understood that variations and modifications can be effected within the spirit and scope of the invention as described hereinabove and as defined in the appended claims.

I claim:

1. A camera for use with a flash unit including a plurality of lamps, said camera comprising:
   a manually operable film advancing member;
   a rotatably socket member for receiving said flash unit;
   spring means rotatively biasing said socket member in a first direction;
   cocking means operable by said film advancing member for rotating said socket member in a second direction opposite to said first direction through a rotational angle of at least 270° in opposition to said spring means;
   first pawl means releasably engageable with said socket member to prevent said socket member from rotating in said first direction, said first pawl means being releasable from engagement with said socket member in response to the reception of a flash unit by said socket member;
   sensing means for sensing the existence and location of a previously unfired lamp in a flash unit received by said socket member; and
   movement arresting means responsive to said sensing means for arresting movement of said socket member in said first direction whenever a previously unfired lamp is located at a predetermined firing position.

2. A camera according to claim 1 in which said cocking means is adapted to rotate said socket member in said first direction through an angle of at least 540° in opposition to said spring means, said camera including second pawl means releasably engageable with said socket member when a flash unit is received thereby to interrupt rotation of said socket member in said first direction at a predetermined angular position of said socket member, said second pawl means being releasable from engagement with said socket member in response to the removal of said flash unit therefrom.

3. Apparatus for use with a flash unit having a plurality of lamps, said apparatus comprising:
   movable socket means for receiving a flash unit;
   drive means for effecting indexing movement of said socket means to successively locate the lamps of a received flash unit at a predetermined position;
   means for sensing the condition of fireability of a lamp located at said predetermined position;
   first movement arresting means responsive to said sensing means for disabling said drive means when a previously unfired lamp is located at said predetermined position;
   second movement arresting means responsive to said presence or absence of a flash unit in said socket for disabling said drive means when there is no flash unit received in said socket; and
   energy storing means for supplying driving power to said driving means.

4. Apparatus according to claim 3 wherein said energy storing means includes means for storing enough energy to effect indexing movement of at least two flash units successively received in said socket means.

5. Apparatus according to claim 3 in which said drive means includes an electrically operated drive element, and said energy storing means includes means for storing electrical energy to provide to said drive element.

* * * * *